United States Patent
Young

(10) Patent No.: US 8,715,122 B2
(45) Date of Patent: May 6, 2014

(54) BLADE TENSIONER WITH SPRING RETAINING FEATURES

(75) Inventor: James D. Young, Chesaning, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 0 days.

(21) Appl. No.: 13/205,590

(22) Filed: Aug. 8, 2011

(65) Prior Publication Data

US 2012/0035010 A1 Feb. 9, 2012

Related U.S. Application Data

(60) Provisional application No. 61/372,088, filed on Aug. 9, 2010.

(51) Int. Cl.
*F16H 7/08* (2006.01)
*F16H 7/18* (2006.01)

(52) U.S. Cl.
USPC .......................................... 474/111; 474/140

(58) Field of Classification Search
USPC ................................................ 474/111, 140
See application file for complete search history.

(56) References Cited

U.S. PATENT DOCUMENTS

| | | | | |
|---|---|---|---|---|
| 3,490,302 | A | * | 1/1970 | Poyser et al. ................. 474/111 |
| 4,921,472 | A | * | 5/1990 | Young ........................... 474/111 |
| 5,055,088 | A | * | 10/1991 | Cradduck et al. ............. 474/111 |
| 5,266,066 | A | * | 11/1993 | White ........................... 474/111 |
| 5,286,234 | A | | 2/1994 | Young |
| 5,425,680 | A | | 6/1995 | Young |
| 5,711,732 | A | * | 1/1998 | Ferenc et al. ................. 474/111 |
| 5,797,818 | A | | 8/1998 | Young |
| 5,984,815 | A | * | 11/1999 | Baddaria ....................... 474/111 |

(Continued)

FOREIGN PATENT DOCUMENTS

| | | |
|---|---|---|
| EP | 0 581 219 | 2/1994 |
| WO | WO 97/33104 | 9/1997 |
| WO | WO 2010/059698 | 5/2010 |

OTHER PUBLICATIONS

International Search Report mailed Oct. 28, 2011 for International application No. PCT/US2011/046980.

(Continued)

*Primary Examiner* — William A Rivera
*Assistant Examiner* — Henry Liu
(74) *Attorney, Agent, or Firm* — Fay Sharpe LLP

(57) ABSTRACT

A chain tensioner blade assembly shoe includes a first spring-receiving slot and a second spring-receiving slot. The first spring-receiving slot includes: (i) a first lower wall; (ii) a first outer wall; (iii) a first locking tab located adjacent the rear face of the shoe. The second spring-receiving slot includes: (i) a second lower wall; (ii) a second outer wall; (iii) a second locking tab located adjacent the rear face of the shoe. The first and second locking tabs extend only partially toward and are spaced from the inner surface of the shoe central portion. A spring is located in a spring-receiving region and includes a first end located in the first spring-receiving slot between the first outer wall and the first locking tab, a second end located in the second spring-receiving slot between the second outer wall and the second locking tab, and a central portion in contact with the inner surface of the shoe central portion. The first and second locking tabs maintain a stand-off distance between the spring and a bracket on which the shoe is mounted.

18 Claims, 9 Drawing Sheets

(56) References Cited

U.S. PATENT DOCUMENTS

| | | | |
|---|---|---|---|
| 6,238,311 B1* | 5/2001 | Cutting | 474/111 |
| 6,354,972 B1 | 3/2002 | Young | |
| 6,364,796 B1* | 4/2002 | Nakamura et al. | 474/111 |
| 6,375,587 B1 | 4/2002 | Wigsten | |
| 6,440,020 B1 | 8/2002 | Tada | |
| 6,524,202 B1 | 2/2003 | Tada et al. | |
| 6,572,502 B1 | 6/2003 | Young et al. | |
| 6,609,986 B1 | 8/2003 | Wigsten | |
| 6,612,953 B2 | 9/2003 | Tada | |
| 6,616,557 B2 | 9/2003 | Tsuruta et al. | |
| 6,623,391 B2* | 9/2003 | Young et al. | 474/111 |
| 6,641,496 B2 | 11/2003 | Tada | |
| 6,808,467 B2* | 10/2004 | Takeda et al. | 474/111 |
| 6,835,149 B2 | 12/2004 | Konno et al. | |
| 6,902,505 B2* | 6/2005 | Yonezawa et al. | 474/111 |
| 6,913,552 B2* | 7/2005 | Young | 474/111 |
| 7,014,585 B2* | 3/2006 | Horikawa et al. | 474/111 |
| 7,479,077 B2 | 1/2009 | Markley et al. | |
| 7,513,843 B2* | 4/2009 | Markley et al. | 474/111 |
| 7,641,577 B2 | 1/2010 | Markley et al. | |
| 7,691,018 B2* | 4/2010 | Haesloop et al. | 474/111 |
| 2002/0039941 A1* | 4/2002 | Nakamura et al. | 474/111 |
| 2002/0045503 A1* | 4/2002 | Young et al. | 474/111 |
| 2002/0069539 A1* | 6/2002 | Tada | 30/383 |
| 2002/0107097 A1* | 8/2002 | Takeda | 474/111 |
| 2002/0142872 A1* | 10/2002 | Tada | 474/111 |
| 2003/0125144 A1* | 7/2003 | Horikawa et al. | 474/111 |
| 2004/0005953 A1* | 1/2004 | Yonezawa et al. | 474/111 |
| 2004/0132570 A1* | 7/2004 | Takeda | 474/111 |
| 2005/0090345 A1 | 4/2005 | Garcia | |
| 2006/0025256 A1 | 2/2006 | Wake | |
| 2006/0223661 A1* | 10/2006 | Haesloop et al. | 474/111 |
| 2006/0234819 A1* | 10/2006 | Markley et al. | 474/111 |
| 2007/0004544 A1* | 1/2007 | Mishima | 474/111 |
| 2007/0037647 A1 | 2/2007 | Markley et al. | |
| 2009/0163311 A1* | 6/2009 | Haesloop | 474/111 |
| 2010/0210384 A1 | 8/2010 | Young et al. | |

OTHER PUBLICATIONS

Written Opinion mailed Oct. 28, 2011 for International application No. PCT/US2011/046980.

International Preliminary Report on Patentability mailed Feb. 21, 2013 for International application No. PCT/US2011/046980.

* cited by examiner

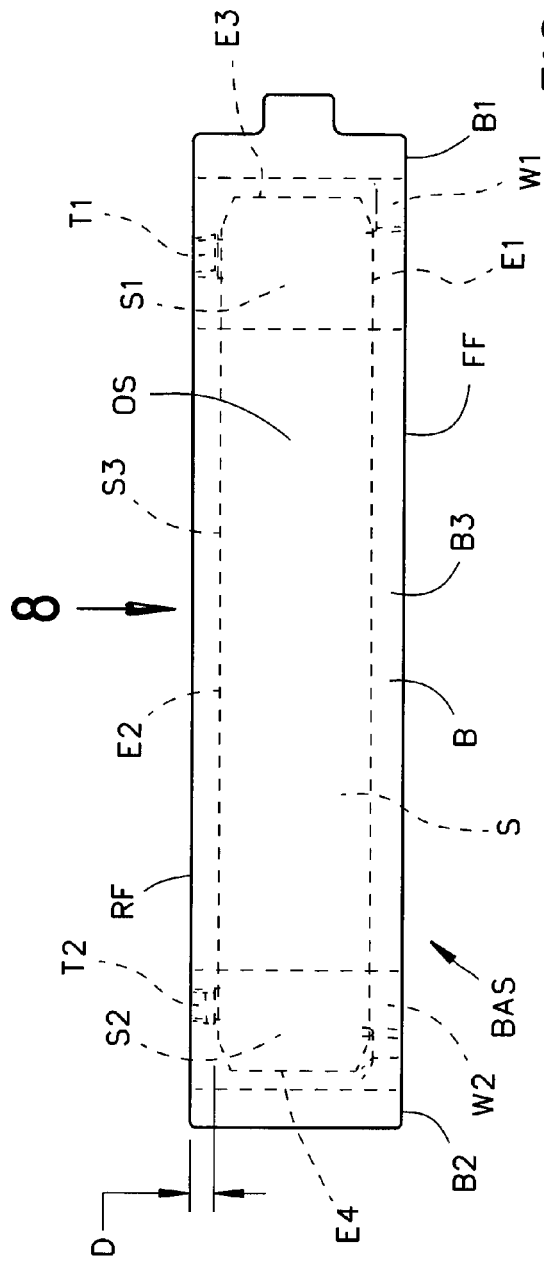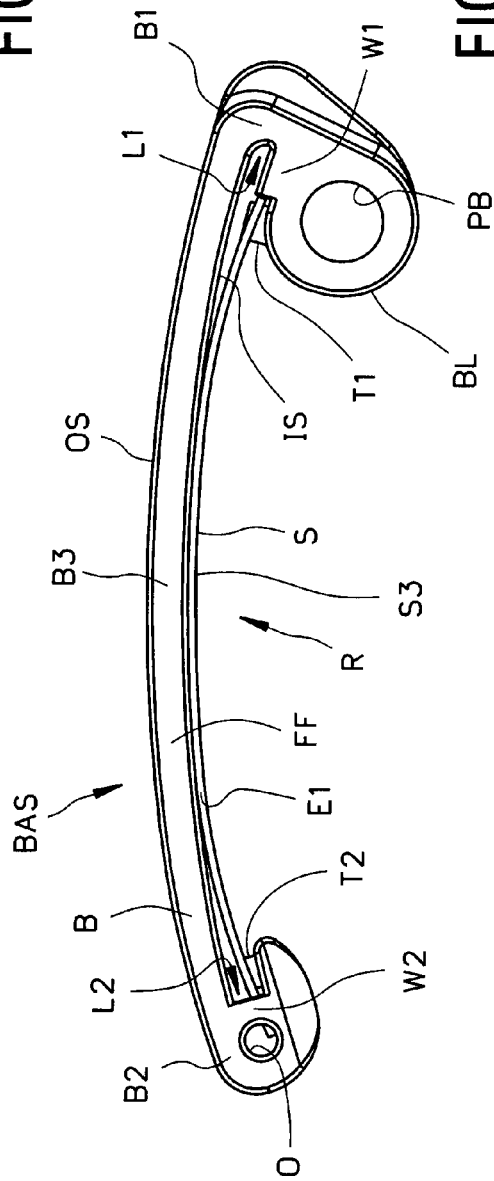

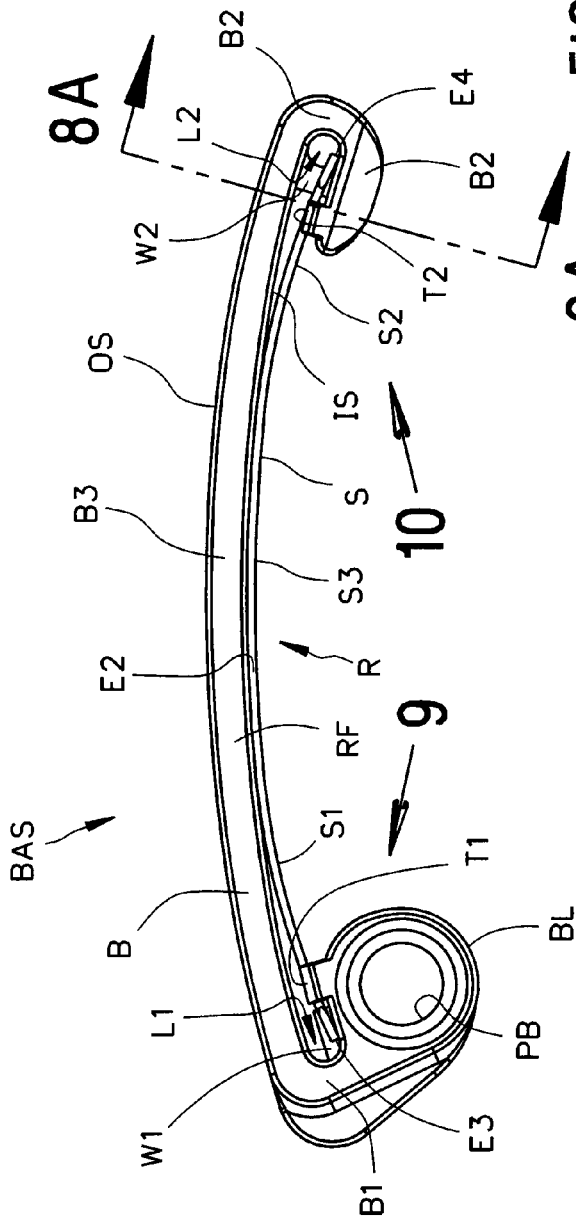
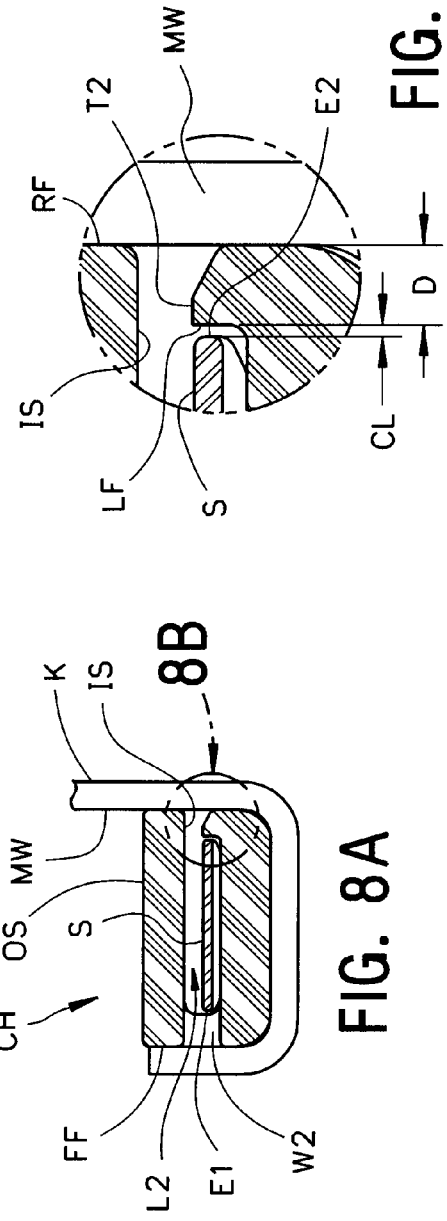
FIG. 8
FIG. 8A
FIG. 8B

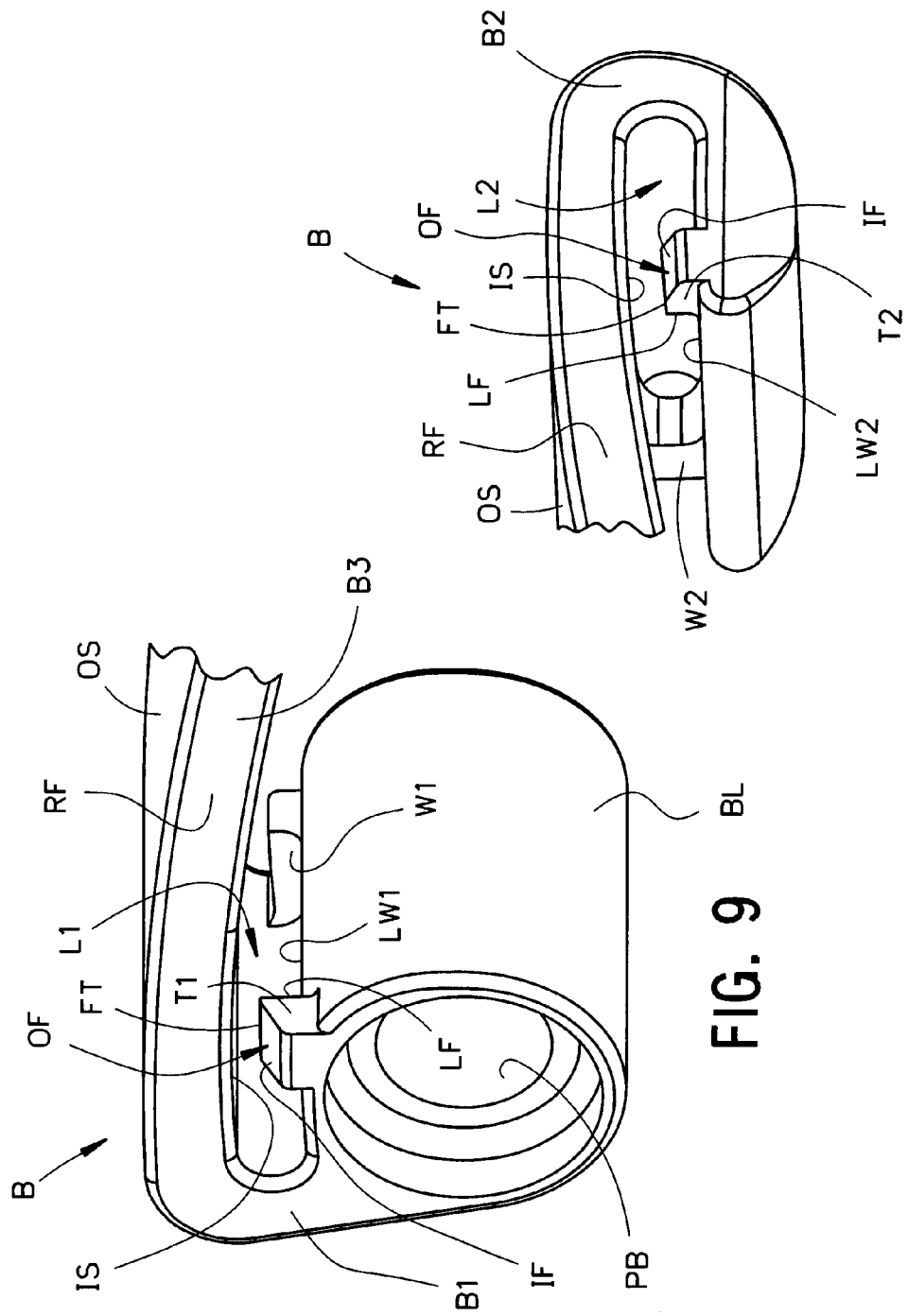

BLADE TENSIONER WITH SPRING RETAINING FEATURES

CROSS-REFERENCE TO RELATED APPLICATION

This application claims priority from and benefit of the filing date of U.S. Provisional Application Ser. No. 61/372,088 filed Aug. 9, 2010, and the entire disclosure of said prior application is hereby incorporated by referenced into the present specification.

BACKGROUND

The present invention relates generally to the automotive chain drive art and, more particularly, to a mechanical blade-type chain tensioner apparatus useful in confined spaces for applying a tensioning force to a chain traveling there past. Prior blade-type chain tensioning devices include a chain engaging blade or shoe member, typically molded from a resinous plastic material, having a metal spring installed therein to provide the shoe sub-assembly with the necessary rigidity and damping characteristics while taking advantage of the flexibility, low friction, and good wear properties of the plastic shoe.

FIG. 1 shows an exemplary known tensioner apparatus T' comprising a bracket K typically defined from a metal stamping and a tensioner blade assembly BAS' operably secured to the bracket. The bracket K is fixedly secured to an associated engine block EB (FIG. 2) as part of a chain drive system that is provided to phase or "time" the rotational position of one or more camshaft sprockets CMS with respect to the rotational position of the crankshaft sprocket CKS. A chain 15 such as a roller/bush chain or inverted tooth chain is engaged with the crankshaft sprocket CKS and the camshaft sprocket(s) CMS and phases/times the camshaft sprocket(s) to the crankshaft sprocket. The crankshaft sprocket CKS rotates in a direction DIR, and the chain 15 includes a taut strand portion 16 and a slack strand portion 17.

In the illustrated embodiment, the known tensioner T' comprises an optional fixed chain guide portion FG. The fixed chain guide portion comprises a fixed guide flange XF that projects transversely from the main wall MW of the bracket K and that is engaged with and supports a fixed chain guide G defined from a polymeric (plastic) material. The fixed chain guide G includes a guide face GF that slidably engages and supports the taut strand 16 of the chain as shown in FIG. 2.

The tensioner T' further comprises a tensioner portion TP. To define the tensioner portion TP, the bracket K comprises a pin P that is welded or otherwise securely affixed to the main wall MW and that projects perpendicularly outward there from. The bracket K further comprises a support flange TF that projects outwardly from the main wall MW. An end of the support flange TF forms or defines a ramp R, and an outer wall OW extends transversely from an outer end of the ramp R and extends parallel to the main wall MW such that a channel CH is defined between the main wall MW, the outer wall OW, and the ramp R.

A known tensioner blade assembly BAS' includes a polymeric or "plastic" shoe B' and a metal spring S releasably connected to the shoe B'. A first or pivot end B1' of the blade assembly BAS' includes a boss or barrel BL that includes pivot bore PB that is slidably received onto the pivot pin P. An opposite second or free end B2' of the blade assembly BAS' is located in the channel CH supported on the ramp R. The bracket K thus maintains the blade assembly BAS' in its proper position with respect to the plane of the chain path while permitting sliding reciprocal translational motion of the second, free end B2' on the ramp R as indicated by the arrow "TRANS" along with the related rotational movement of the blade assembly BAS' at the pivot end B1' as indicated by the arrow labeled "ROTATE" in response to changes in the tension and position of the slack strand 17 of the chain 15 and corresponding oscillatory movement of the slack strand 17 as indicated by the arrow "AMPL." FIG. 2A is a partial view of the tensioner T' that shows this operative movement of the blade assembly BAS' using solid lines for a first position of the blade assembly BAS' and phantom lines for a second position of the blade assembly BAS'. The pivot pin P can be replaced by a shoulder bolt or any other suitable fastener that allows rotation of the pivot end B1' of the shoe B' relative to the bracket K.

FIGS. 3-5 illustrates the known blade assembly BAS' by itself, separated from the bracket K. The shoe B' is a one-piece molded polymeric construction and the spring S is a one-piece metal stamping leaf-spring structure or the like. The shoe B' includes a rear face RF that lies adjacent and/or slidably abuts the main wall of the bracket K when the blade assembly BAS' is operatively installed on the bracket K. The shoe B' also includes an opposite front face FF that is spaced from the bracket main wall MW and that faces away from the bracket main wall MW when the blade assembly BAS' is operatively installed on the bracket T.

The pivot end B1' of the shoe B' and a free end B2' of the shoe B' define respective first and second spring-receiving slots L1',L2' for receiving and retaining opposite ends S1,S2 of the spring S. The shoe B' includes a central body B3 that extends between and interconnects the pivot and free ends B1',B2'. An upper or outer surface OS of the central body B3 provides a chain contact surface for being slidably engaged by an associated chain being tensioned. The central body B3 includes a lower or inner surface IS that is defined by the underside of the central body B3 that is opposite the outer surface OS. The inner surface IS is contacted by an arched central portion S3 of the spring S.

The first end S1 of the spring S is retained in the slot L1' between a first outer wall W1 and the main wall MW of the bracket K. The first outer wall W1 abuts or lies closely adjacent an outer spring edge E1 and an inner spring edge E2 lies closely adjacent and/or in contact with the main wall MW of the bracket K. The second end S2 of the spring S is retained in the slot L2' between a second outer wall W2 and the bracket main wall MW. The second outer wall W2 abuts or lies closely adjacent the outer spring edge E1 and the inner spring edge E2 abuts and/or lies closely adjacent the bracket main wall MW. Accordingly, as can be seen in FIG. 4, the inner spring edge E2 is located adjacent and flush with the rear face RF of the shoe B' which causes the inner spring edge E2 to contact the main wall MW of the bracket K during use of the tensioner T'. Repetitive high-speed sliding contact between the inner spring edge E2 and the bracket main wall MW causes polishing of the main wall MW—and in cases where the chain drive dynamics are excessive—erosion of the main wall is known to occur, particularly near the spring ends, and this may induce relative movement of the spring S relative to the plastic shoe B' due to friction between the spring inner edge E2 and the bracket main wall MW, which leads to abrading or cutting damage of the plastic shoe B' in the areas where it is contacted by the spring S.

Several prior art patents show such blade-type mechanical chain tensioning devices that include a blade spring that can be manufactured from spring steel strip stock without any notches or cutouts to the spring and which are normally cut to length from the steel strip stock and then formed to provide a desired free height. For example, prior U.S. Pat. No. 5,286, 234 to James D. Young discloses a chain tensioner wherein such a blade spring is received laterally into a slot of an elongated plastic shoe and the spring is laterally restrained on one side by the outside walls of the shoe at each end of the slot and on the opposite side by the tensioner bracket wall.

Another structure is described in U.S. Pat. No. 5,266,066 to David C. White, in which the installed blade spring is laterally restrained by a "fence"—effectively, a longitudinal rib—on the underside (concave side) of the shoe.

These prior art blade tensioners have disadvantages, however, for some chain drive applications having higher camshaft and/or crankshaft torsional vibrations that may result in increased blade flexing during engine operation and thereby requiring higher tensioning loads to limit the amplitude of the blade flexing at its central region. A particular drawback associated with the tensioner defined in U.S. Pat. No. 5,286, 234 to Young is the potential for excessive erosion to the bracket wall caused by spring edge-to-wall contact with the more dynamically active chain drive systems. A particular limitation with the blade shoe as disclosed in U.S. Pat. No. 5,266,066 to White is that during engine operation the underside of the blade at its central region will be more highly stressed—particularly at the outermost fiber of the fence—than for a blade having a rectangular cross-section. High stresses may also occur in the fillet region between the fence and blade central body.

A further construction is shown in Ferenc et al. U.S. Pat. No. 5,711,732. This blade-type tensioner does not have the limitations of the above described prior art devices, but this is achieved by the design compromise of incorporating central notches at each end of the blade spring which have been found to abrade the plastic blade shoe over time as the blade flexes and the ends of the spring slide relative to the adjacent portions of the plastic shoe.

SUMMARY

In accordance with one aspect of the present development, a chain tensioner blade assembly includes a shoe with a first end, a second end, and a central portion that extends between the first end and the second end. The central portion includes: (i) an outer surface adapted for being slidably engaged by an associated chain; and, (ii) an inner surface located on an opposite side of said central portion relative to said outer surface. A pivot bore is defined in the first end of the shoe. The first end of the shoe includes a first spring-receiving slot and the second end of the shoe includes a second spring-receiving slot. The first spring-receiving slot, the second spring-receiving slot, and the inner surface of the shoe provide a spring-receiving region. The first spring-receiving slot includes: (i) a first lower wall that is spaced from and faces the inner surface of the shoe central portion; (ii) a first outer wall located adjacent a front face of the shoe and connected to the first lower wall; (iii) a first locking tab located adjacent a rear face of the shoe and connected to the first lower wall. The first locking tab extends only partially toward and is spaced from the inner surface of the shoe central portion. The second spring-receiving slot includes: (i) a second lower wall that is spaced from and faces the inner surface of the shoe central portion; (ii) a second outer wall located adjacent the front face of the shoe and connected to the second lower wall; (iii) a second locking tab located adjacent the rear face of the shoe and connected to the second lower wall. The second locking tab extends only partially toward and is spaced from the inner surface of the shoe central portion. A spring is located in the spring-receiving region. The spring includes: (i) a first end located in the first spring-receiving slot between the first outer wall and the first locking tab; (ii) a second end located in the second spring-receiving slot between the second outer wall and the second locking tab; and, (iii) a central portion in contact with the inner surface of the shoe central portion.

In accordance with another aspect of the present development, a chain tensioner includes a bracket including: (i) a main wall; (ii) a pivot pin projecting outwardly from the main wall; and, (iii) a ramp that extends outwardly from the main wall. The chain tensioner further includes a tensioner blade assembly operatively connected to the bracket. The tensioner blade assembly includes a shoe with a first end, a second end, and a central portion that extends between the first end and the second end. The central portion includes: (i) an outer surface; and, (ii) an inner surface located on an opposite side of the central portion relative to the outer surface. A pivot bore is defined in the first end of the shoe, and the pivot pin of the bracket is received in the pivot bore, and the second end of the shoe is supported on the ramp of the bracket. The first end of the shoe includes a first spring-receiving slot and the second end of the shoe includes a second spring-receiving slot. The first spring-receiving slot, the second spring-receiving slot, and the inner surface of the shoe provide a spring-receiving region. The first spring-receiving slot includes: (i) a first lower wall that is spaced from and faces the inner surface of the shoe central portion; (ii) a first outer wall located adjacent a front face of the shoe and connected to the first lower wall; and, (iii) a first locking tab located adjacent a rear face of the shoe and connected to the first lower wall. The first locking tab extends only partially toward and is spaced from the inner surface of the shoe central portion. The second spring-receiving slot includes: (i) a second lower wall that is spaced from and faces the inner surface of the shoe central portion; (ii) a second outer wall located adjacent the front face of the shoe and connected to the second lower wall; and, (iii) a second locking tab located adjacent the rear face of the shoe and connected to the second lower wall. The second locking tab extends only partially toward and is spaced from the inner surface of the shoe central portion. A spring is located in the spring-receiving region. The spring includes: (i) a first end located in the first spring-receiving slot between the first outer wall and the first locking tab; (ii) a second end located in the second spring-receiving slot between the second outer wall and the second locking tab; and, (iii) a central portion in contact with the inner surface of the shoe central portion. The first and second locking tabs maintain a space between the spring and the main wall of said bracket and prevent contact between the spring and the main wall of the bracket.

BRIEF DESCRIPTION OF DRAWINGS

FIG. 6 is a front view of a blade assembly formed in accordance with an exemplary embodiment of the present development;

FIG. 7 is a top or plan view of the blade assembly of FIG. 6, and shows hidden features in broken lines;

FIG. 8 is a rear view of the blade assembly of FIG. 6;

FIG. 8A is a section view taken at line 8A-8A of FIG. 8 (FIG. 8A also shows the blade assembly operatively installed on a bracket such as the bracket K of FIG. 1);

FIG. 8B is a greatly enlarged view of detail portion 8B of FIG. 8A;

FIG. 9 is a greatly enlarged partial isometric view of the first spring-receiving slot of the shoe portion of a blade assembly as taken according to view arrow 9 of FIG. 8;

FIG. 10 is a greatly enlarged partial isometric view of the second spring-receiving slot of the shoe portion of a blade assembly as taken according to view arrow 10 of FIG. 8.

DETAILED DESCRIPTION

Figure 1:
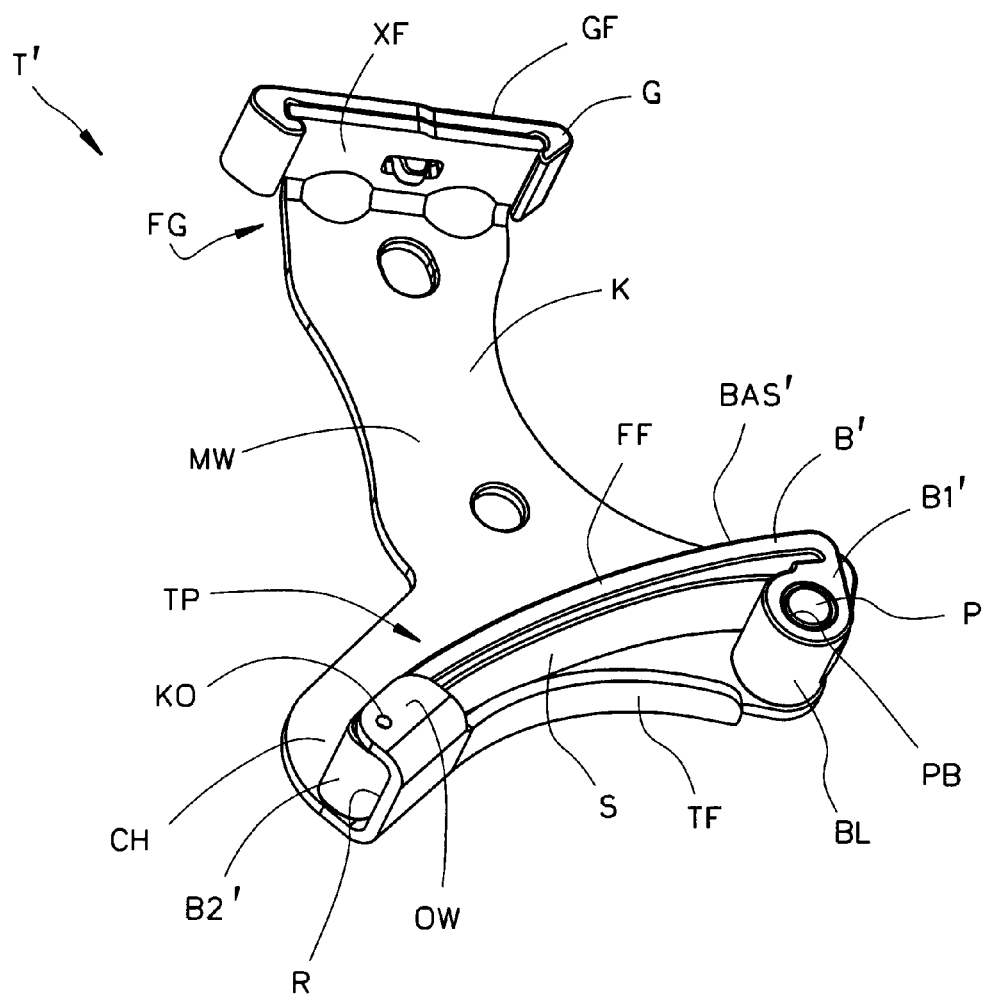
FIG. 1 shows a known tensioner apparatus comprising a bracket and a tensioner blade assembly operably secured to the bracket.
Figure 2:
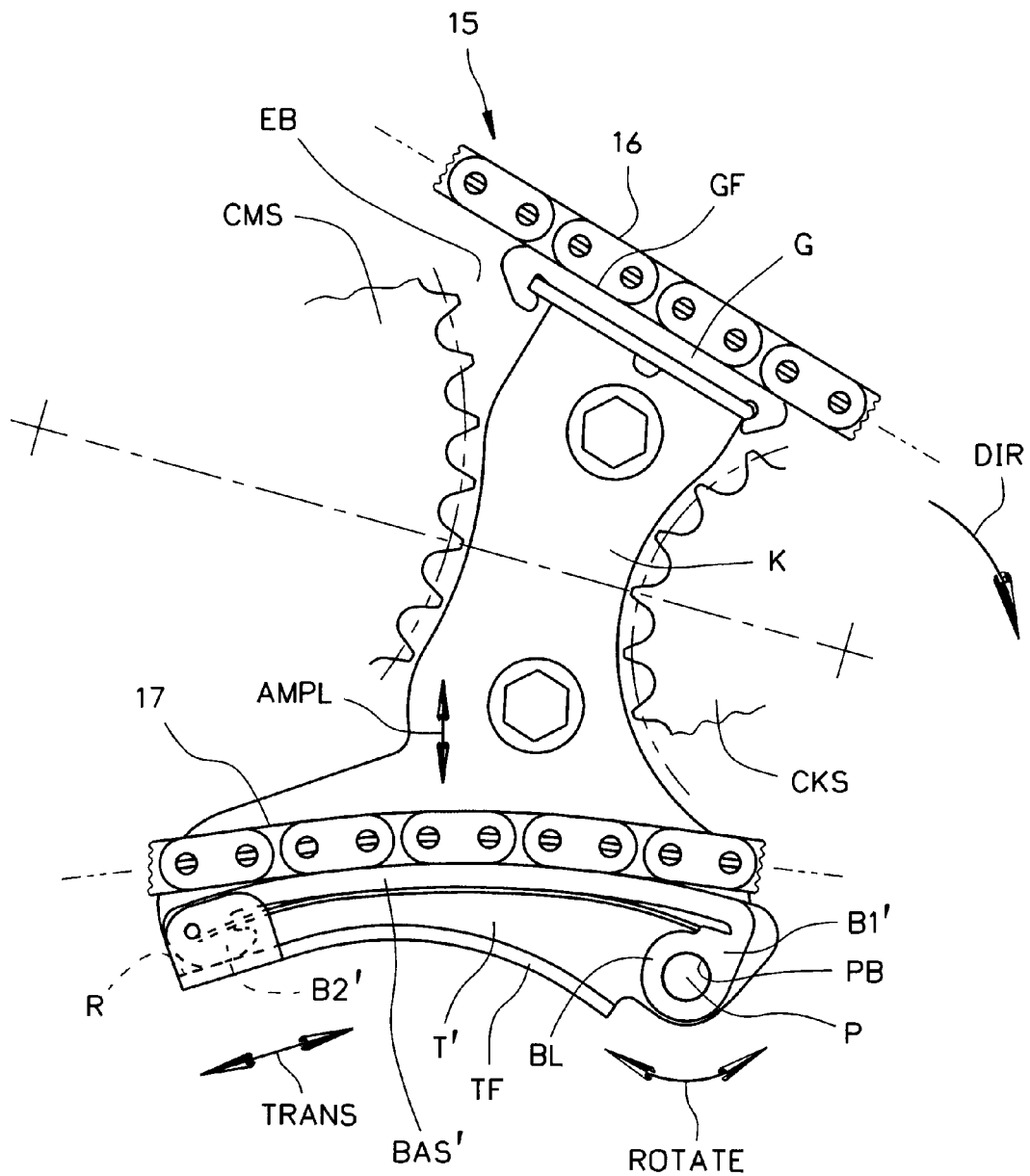
FIG. 2 shows the known tensioner apparatus of FIG. 1 operatively installed on an engine to tension and guide a chain of an associated chain drive system.
Figure 2A:
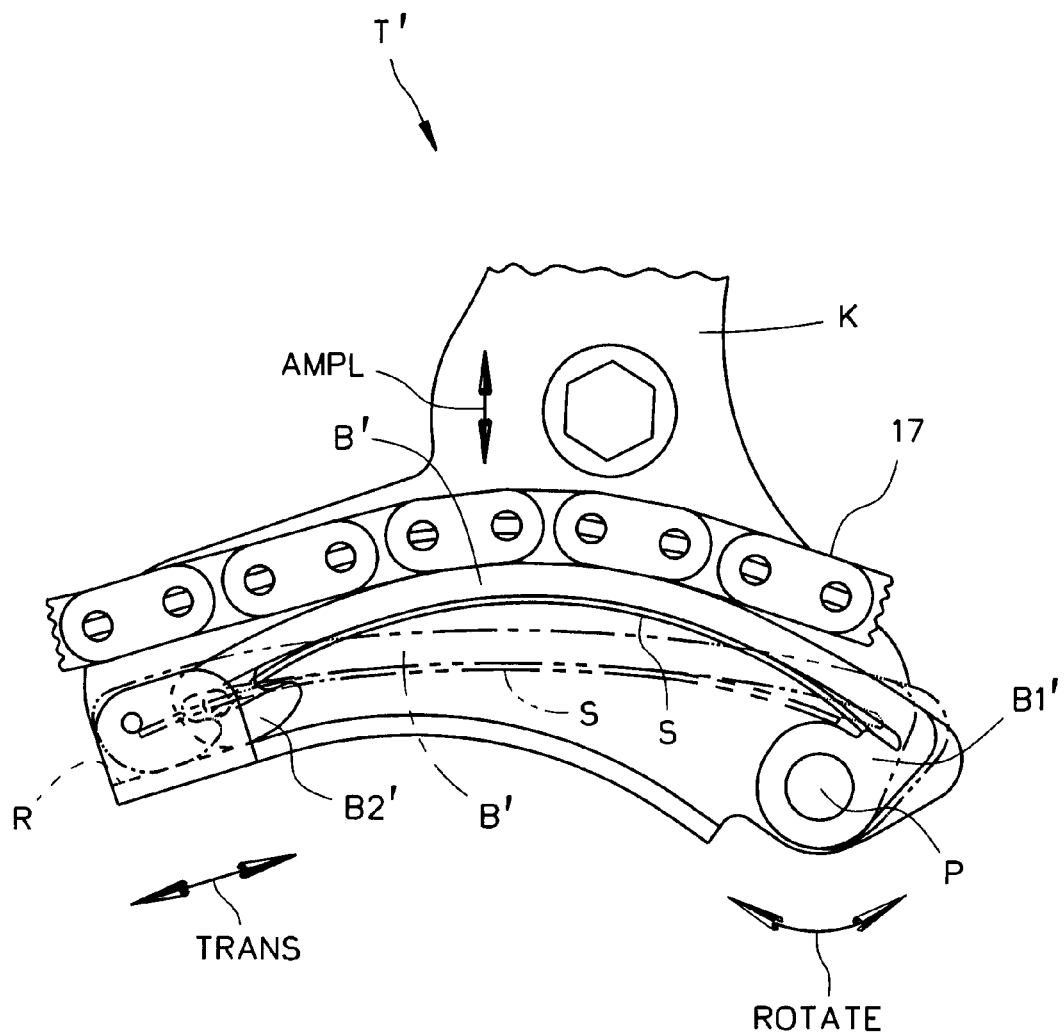
FIG. 2A is an enlarged portion of FIG. 2 and shows first operative position of the blade assembly in solid lines and a second operative position of the blade assembly in phantom lines.
Figure 3:
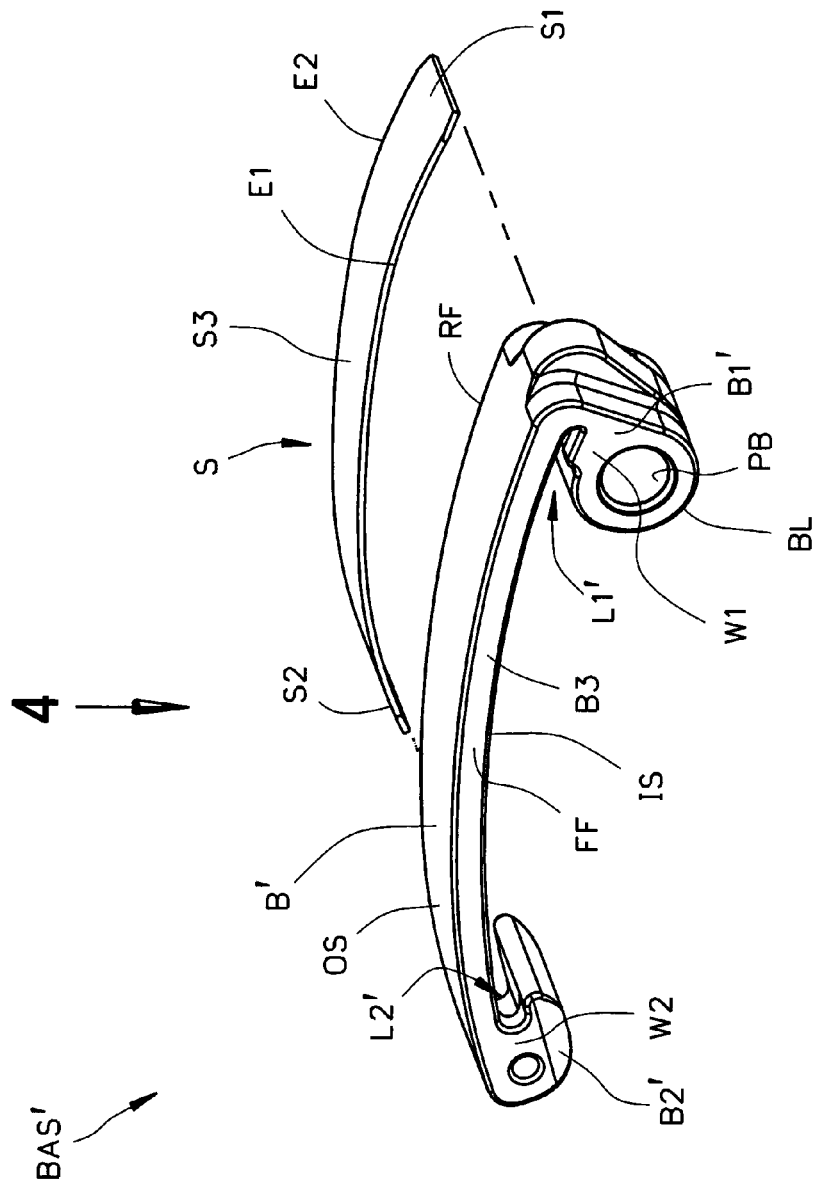
FIG. 3 is an exploded isometric view of the known blade assembly of FIGS. 1-2A.
Figure 4:
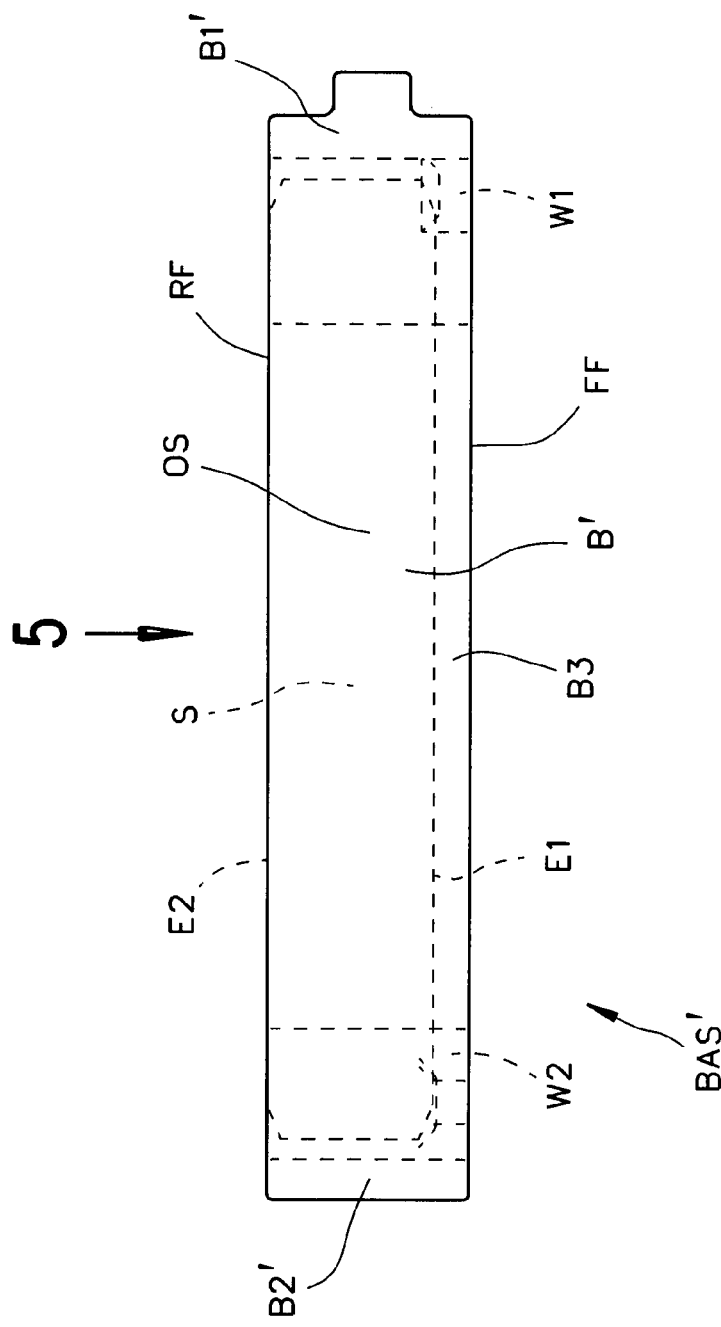
FIG. 4 is a top or plan view of the known blade assembly of FIGS. 1-2A, and shows hidden features in broken lines.
Figure 5:
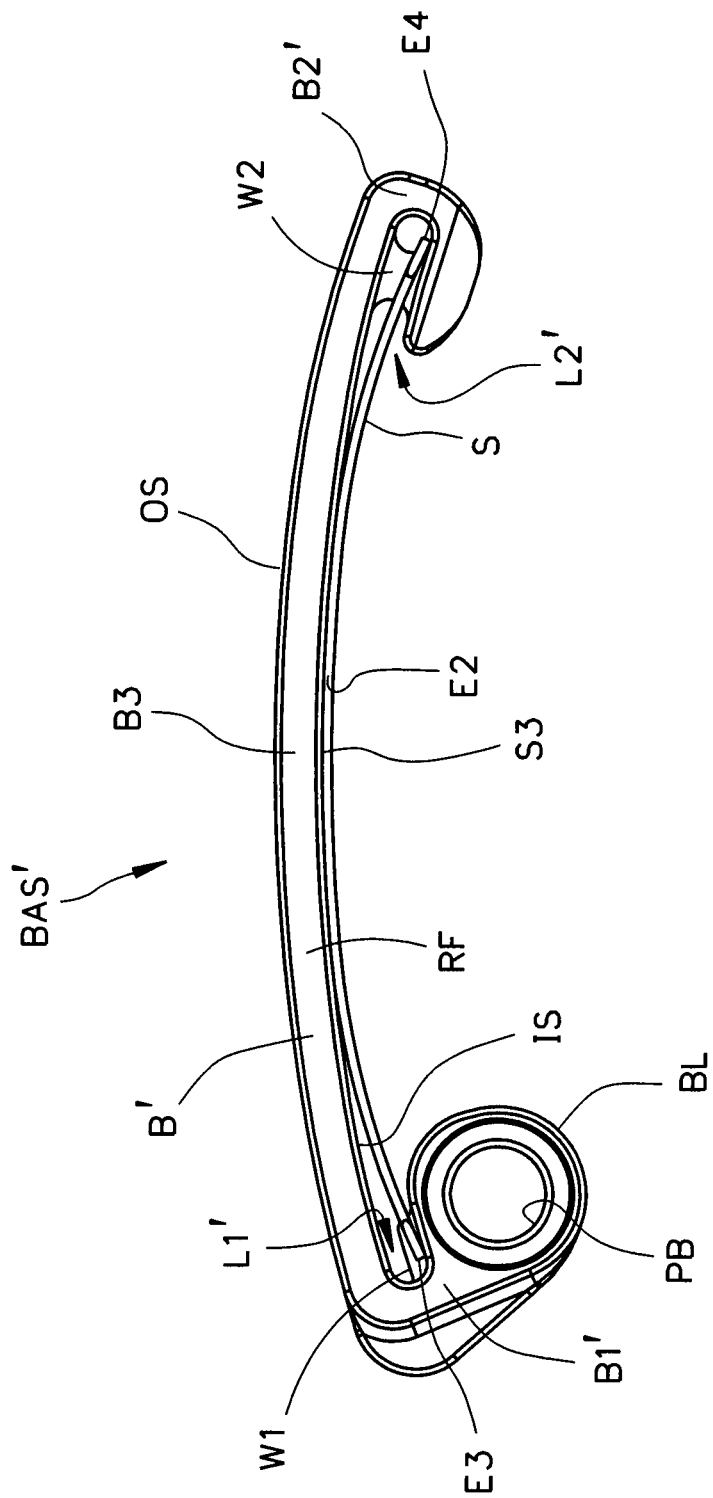
FIG. 5 is a rear view of the blade assembly of FIGS. 1-2A.

FIG. 6 is a front view of the tensioner blade assembly BAS of the present development including a polymeric or "plastic" shoe B and a metal spring S releasably connected to the shoe B. FIG. 7 is a top view of the blade assembly BAS and FIG. 8 is a rear view of the blade assembly BAS. Except as otherwise shown and/or described herein, the blade assembly BAS is structured and functions the same as the known blade assembly BAS'. Accordingly, the present tensioner blade assembly BAS is adapted to be operably connected to an associated bracket such as the bracket K described above in connection with FIGS. 1, 2, and 2A for the known blade assembly BAS' to provide a tensioner assembly according to the present development comprising the bracket K and the blade assembly BAS operatively installed therein.

The shoe B is a one-piece molded polymeric construction or body and the spring S is a one-piece metal stamping or like leaf-spring structure or body. The shoe B includes a first or pivot end B1 and a second or free end B2. The first end B1 includes a boss or barrel BL in which a pivot bore PB is defined. The tensioner blade assembly BAS is operably connected to the bracket K in the same manner as the known blade assembly BAS' of FIG. 1, with the pivot pin P of the bracket closely slidably received in the pivot bore PB and the free end B2 of the blade assembly BAS located in the channel CH of the bracket K, supported on the ramp R. The first and second ends B1,B2 define respective first and second spring-receiving slots L1,L2 for respectively receiving a retaining first and second opposite ends S1,S2 of the spring S. The shoe B includes a central body or central portion B3 that extends between and interconnects the pivot and free ends B1,B2. An upper or outer surface OS of the central portion B3 provides a chain contact surface adapted for being slidably engaged by an associated chain being tensioned. The central portion B3 includes a lower or inner surface IS that is defined by the underside of the central portion B3 that is opposite the outer surface OS. The inner surface IS is contacted by an arched central portion S3 of the spring S.

As such, the first and second spring-receiving slots L1,L2 and the inner surface IS of the shoe central portion B3 define a spring-receiving slot or region R that opens through a front face FF of the shoe B and that also opens through a rear face RF of the shoe. As best seen in the plan view of FIG. 7, the spring S is defined to have a substantially rectangular perimeter (with optional rounded or chamfered corners) such that the spring S includes outer (front) and inner (rear) parallel linear lateral edges E1,E2 and first and second parallel linear first and second end edges E3,E4.

FIG. 8 provides a rear view of the tensioner blade assembly BAS. With reference also to FIG. 9, which is a greatly enlarged view of the first spring-receiving slot L1 of the shoe B, the first end S1 of the spring S (not shown in FIG. 9) is retained in the slot L1 between a first outer wall W1 and a first locking tab T1. The first outer wall W1 is located adjacent the shoe front face FF and abuts or lies closely adjacent the outer spring edge E1. The first locking tab T1 is located adjacent the shoe rear face RF and abuts or lies closely adjacent the inner spring edge E2. The first spring end S1 is captured in the first spring-receiving slot L1 between the first outer wall W1 and the first locking tab T1, with minimal clearance between the first spring end S1 and the first outer wall W1 and the first locking tab T1 to prevent lateral movement of the first spring end S1 between the first outer wall W1 and the first locking tab T1. The first end S1 of the spring contacts a first lower wall LW1 of the slot L1 that is spaced from and faces the inner surface IS of the shoe central portion B3. Both the first outer wall W1 and the first locking tab T1 are connected to and project outwardly from the lower wall LW1 of the slot L1 and both extend only partially or part-way toward the shoe central portion B3 such that space is defined between the shoe central portion B3 and both the first outer wall W1 and the first locking tab. In the exemplary embodiment, the lower wall LW1 is provided by an outer surface of the boss or barrel BL in which the pivot bore PB is defined.

FIG. 10 provides a greatly enlarged view of the second spring-receiving slot L2 of the shoe B, the second end S2 of the spring (not shown in FIG. 10) is retained in the slot L2 between a second outer wall W2 and a second locking tab T2. The second outer wall W2 is located adjacent the shoe front face FF and abuts or lies closely adjacent the outer spring edge E1. The second locking tab T2 is located adjacent the shoe rear face RF and abuts or lies closely adjacent the inner spring edge E2. The second end S2 of the spring S is captured in the slot L2 between the second outer wall W2 and the second locking tab T2, with minimal clearance between the second spring end S2 and the second outer wall W2 and the second locking tab T2 to prevent or at least minimize lateral movement of the second spring end S2 between the second outer wall W2 and the second locking tab T2. The second end S2 of the spring contacts a second lower wall LW2 of the slot that is spaced from and faces the inner surface IS of the shoe central portion B3. Both the second outer wall W2 and the second locking tab T2 are connected to a project outwardly or upwardly from the lower wall LW2. The second outer wall W2 extends completely to and connects with the shoe central portion B3, while the second locking tab T2 extends only partially or part-way toward the shoe central portion B3, such that a space is defined between the second locking tab T2 and the inner surface IS of the shoe central portion B3. Alternatively, the first outer wall W1 extends completely from the first lower wall LW1 to the inner surface IS. The second outer wall W2 preferably comprises a pin-receiving opening O that is adapted to receive a release pin that is used for releasably securing the free end B2 of the blade assembly BAS in the bracket channel CH during shipping and handling of a tensioner comprising the bracket K and the blade assembly BAS operatively installed on the bracket K. The bracket outer wall OW includes a corresponding release pin opening KO (FIG. 1) for this same purpose.

With continuing reference to FIGS. 9 and 10, it can be seen that the first and second locking tabs T1,T2 each comprise an upper or outer face OF that is generally oriented toward and spaced from the inner surface IS of the shoe central portion B3. Each outer face OF is dimensioned and conformed to facilitate sliding insertion of the spring S there over between itself and the shoe inner surface IS during sliding movement of the spring S into the slots L1,L2 of the spring-retaining region R. In the illustrated example, the respective outer faces OF each comprise an inclined face IF that begins adjacent the rear face RF of the shoe B and that extends closer to the shoe central portion B3 as it extends inwardly away from the rear face RF of the shoe B. The respective outer faces OF each further comprise a flat face FT that connects the respective inclined faces IF to respective lock faces LF that lie transverse to the flat face FT. The transverse lock faces LF connect the innermost end of the flat faces FT to the respective lower walls LW1,LW2. The lock faces LF are respectively oriented toward the first and second outer walls W1,W2 located on the opposite sides of the slots L1,L2, such that the installed spring end S1 is captured between the first outer wall W1 and the lock face LF of the first locking tab T1, and the spring end S2 is captured between the second outer wall W2 and the lock face LF of the second locking tab T2.

With reference again to FIG. 7, it can be seen that the presence of the first and second locking tabs T1,T2 ensures that the inner spring edge E2 is always spaced at least a minimum stand-off distance D from the rear face RF of the shoe B (and from the bracket main wall MW located adjacent the rear face RF, which is not shown in FIG. 7). This prevents damage to the bracket main wall MW and/or to the tensioner blade assembly BAS as described above in relation to the known tensioner assembly T'.

FIG. 8A is a section view taken at line 8A-8A of FIG. 8. Unlike FIG. 8, FIG. 8A shows the blade assembly operatively installed on the bracket K of FIG. 1 (the bracket K is only partially shown). FIG. 8B is a greatly enlarged view of detail portion 8B of FIG. 8A. It can be seen that when the tensioner blade assembly BAS is operatively installed on a bracket K, the presence of the second locking tab T2 (and also the first locking tab T1 not shown in FIGS. 8A and 8B) ensures that the inner spring edge E2 is always spaced at least the minimum stand-off distance D from the main wall MW of the bracket K. It should be noted that the clearance space CL shown in FIG. 8B between the spring inner edge E2 and the lock face LF of the second locking tab T2 is within the range of acceptable tolerance limits for minimal clearance between the spring inner edge E2 and the lock face LF to minimize undesired lateral movement of the spring S between the second locking tab T2 and the second outer wall W2.

Those of ordinary skill in the art will recognize that the opposite first and second end edges E3,E4 of the spring S are linear (as shown) or curved and extend continuously without notches or other openings or interruptions. The first and second end edges E3,E4 extend continuously adjacent said first and second lower walls LW1,LW2 in said first and second spring-receiving slots S1,S2, respectively, over said full length of said first and second end edges E3,E4. The uninterrupted structure for the end edges E3,E4 increases the bearing or contact area between the first and second end edges E3,E4 and the respective lower walls LW1,LW2 of the slots L1,L2 and/or other surfaces of the slots L1,L2 which reduces wear of the shoe B over time and, thus reduces the likelihood of failure during the required useful life of the tensioner T. Also, the absence of notches or opening in the spring end edges E3,E4 reduces the likelihood that burrs or other sharp regions are present that will abrade the plastic of the shoe B over time.

Between the slots L1,L2, the spring-retaining region R is completely open and opens through both the front face FF and rear face RF of the shoe B. It has been deemed beneficial to eliminate all walls or tabs that extend from the inner surface IS of the shoe central body B3, as these walls/tabs can create stress risers due to the flexing of the shoe central portion during engine operation.

To assemble the blade assembly BAS, the shoe B is resiliently deformed to decrease the radius of the outer surface OS by decreasing the distance between the first and second shoe ends B1,B2, which causes the spring-receiving region R to temporarily assume a shape that approximates the free shape of the spring S. The first and second spring ends S1,S2 are then inserted simultaneously into the first and second spring-receiving slots S1,S2 by insertion through the spaces defined between the first and second locking tabs T1,T2 and the inner surface IS at the rear face RF of the shoe (the spring S is optionally also resiliently deformed during this installation process). When the spring S is fully received in the first and second slots S1,S2, the spring S and shoe B are allowed to relax such that the spring is captured in the spring-receiving region R as described above.

The invention has been described with reference to preferred embodiments. Modifications and alterations will occur to those of ordinary skill in the art to which the invention pertains, and it is intended that the claims be construed as encompassing all such modifications and alterations.

The invention claimed is:

1. A chain tensioner blade assembly comprising:
a shoe comprising a first end, a second end, and a central portion that extends between the first end and the second end, said central portion comprising: (i) an outer surface adapted for being slidably engaged by an associated chain; and, (ii) an inner surface located on an opposite side of said central portion relative to said outer surface;
a pivot bore defined in the first end of the shoe;
said first end of said shoe comprising a first spring-receiving slot and said second end of said shoe comprising a second spring-receiving slot;
said first spring-receiving slot, said second spring-receiving slot, and said inner surface of said shoe providing a spring-receiving region;
said first spring-receiving slot comprising: (i) a first lower wall that is spaced from and faces the inner surface of said shoe central portion; (ii) a first outer wall located adjacent a front face of the shoe and connected to said first lower wall; (iii) a first locking tab located adjacent a rear face of the shoe and connected to said first lower wall, said first locking tab extending only partially toward and spaced from said inner surface of said shoe central portion;
said second spring-receiving slot comprising: (i) a second lower wall that is spaced from and faces the inner surface of said shoe central portion; (ii) a second outer wall located adjacent said front face of the shoe and connected to said second lower wall; (iii) a second locking tab located adjacent said rear face of the shoe and connected to said second lower wall, said second locking tab extending only partially toward and spaced from said inner surface of said shoe central portion;
a spring located in the spring-receiving region, said spring comprising: (i) a first end located in the first spring-receiving slot between the first outer wall and the first locking tab;
(ii) a second end located in the second spring-receiving slot between the second outer wall and the second locking tab; (iii) a central portion in contact with said inner surface of said shoe central portion; (iv) inner and outer lateral edges; and, (v) first and second end edges;

said outer lateral edge of said spring captured in said spring-receiving region by both said first and second outer walls; and said inner lateral edge of said spring captured in said spring-receiving region by both said first and second locking tabs, wherein said inner lateral edge of said spring is located adjacent said first and second locking tabs such that said first and second locking tabs maintain a stand-off distance (D) between said inner lateral edge of said spring and said rear face of said shoe.

2. The chain tensioner blade assembly as set forth in claim 1, wherein said first outer wall and said first locking tab each extend only part-way from said first lower wall toward said inner surface of said shoe central portion so that said first outer wall and said first locking tab are spaced from said inner surface of said shoe central portion.

3. The chain tensioner blade assembly as set forth in claim 2, wherein said second locking tab extends only part-way from said second lower wall toward said inner surface of said shoe central portion so that said second locking tab is spaced from said inner surface of said shoe central portion.

4. The chain tensioner blade assembly as set forth in claim 3, wherein said second outer wall extends between and interconnects said second lower wall and said inner surface of said shoe central portion, said second outer wall comprising a pin-receiving opening defined therein.

5. The chain tensioner blade assembly as set forth in claim 1, wherein said first and second locking tabs each comprise:
an outer face including an inclined portion that extends toward the inner surface of the shoe central portion as it extends from the shoe rear face toward the shoe front face; and
a lock face oriented transversely to the outer face;
wherein said lock face of said first locking tab is oriented toward and is spaced from said first outer wall and said lock face of said second locking tab is oriented toward and is spaced from said second outer wall.

6. The chain tensioner blade assembly as set forth in claim 5, wherein said outer face of each of the first and second locking tabs further includes a flat face that connects said inclined face to said lock face, wherein said flat face enables movement of said first and second spring ends into said first and second spring-receiving slots during assembly of said chain tensioner blade assembly.

7. The chain tensioner blade assembly as set forth in claim 5, wherein:
said first end of said spring is abutted with said first lower wall of said first slot; and,
said second end of said spring is abutted with said second lower wall of said second slot.

8. The chain tensioner blade assembly as set forth in claim 7, wherein said spring comprises a one-piece metal body, and said first and second end edges of said spring are defined continuously linearly or curved without interruption such that said first and second end edges extend continuously adjacent said first and second lower walls in said first and second spring-receiving slots over said full length of said first and second end edges.

9. The chain tensioner blade assembly as set forth in claim 1, wherein said shoe comprises a one-piece molded polymeric body.

10. The chain tensioner blade assembly as set forth in claim 9, further comprising a bracket on which said blade assembly is operatively installed, said bracket comprising:
a pivot pin that is located in said pivot bore of said shoe; and,
a channel defined between a bracket main wall, a ramp that extends outwardly from the bracket main wall, and a bracket outer wall that extends from the ramp at a location spaced from the bracket main wall, wherein said second end of said shoe is located in said channel and supported on said ramp;
wherein said first and second locking tabs are located between said inner lateral edge of the spring and the bracket main wall and maintain the stand-off distance (D) between the inner lateral edge of the spring and the bracket main wall.

11. A chain tensioner comprising:
a bracket comprising: (i) a main wall; (ii) a pivot pin projecting outwardly from the main wall; and, (iii) a ramp that extends outwardly from the main wall; and,
a tensioner blade assembly operatively connected to said bracket, said tensioner blade assembly comprising:
a shoe comprising a first end, a second end, and a central portion that extends between the first end and the second end, said central portion comprising: (i) an outer surface; and, (ii) an inner surface located on an opposite side of said central portion relative to said outer surface;
a pivot bore defined in the first end of the shoe, wherein said pivot pin of said bracket is received in said pivot bore and said second end of said shoe is supported on said ramp of said bracket;
said first end of said shoe comprising a first spring-receiving slot and said second end of said shoe comprising a second spring-receiving slot;
said first spring-receiving slot, said second spring-receiving slot, and said inner surface of said shoe providing a spring-receiving region;
said first spring-receiving slot comprising: (i) a first lower wall that is spaced from and faces the inner surface of said shoe central portion; (ii) a first outer wall located adjacent a front face of the shoe and connected to said first lower wall; (iii) a first locking tab located adjacent a rear face of the shoe and connected to said first lower wall, said first locking tab extending only partially toward and spaced from said inner surface of said shoe central portion;
said second spring-receiving slot comprising: (i) a second lower wall that is spaced from and faces the inner surface of said shoe central portion; (ii) a second outer wall located adjacent said front face of the shoe and connected to said second lower wall; (iii) a second locking tab located adjacent said rear face of the shoe and connected to said second lower wall, said second locking tab extending only partially toward and spaced from said inner surface of said shoe central portion;
a spring located in the spring-receiving region, said spring comprising: (i) a first end located in the first spring-receiving slot between the first outer wall and the first locking tab; (ii) a second end located in the second spring-receiving slot between the second outer wall and the second locking tab; (iii) a central portion in contact with said inner surface of said shoe central portion; (iv) inner and outer lateral edges; and, (v) first and second end edges;
wherein said first and second locking tabs are located between said inner lateral edge of said spring and said main wall of said bracket and maintain a space between said spring and said main wall of said bracket and prevent contact between said spring and said main wall of said bracket.

12. The chain tensioner as set forth in claim 11, wherein said first outer wall and said first locking tab each extend only part-way from said first lower wall toward said inner surface of said shoe central portion so that said first outer wall and said first locking tab are spaced from said inner surface of said shoe central portion.

13. The chain tensioner as set forth in claim 12, wherein said second locking tab extends only part-way from said second lower wall toward said inner surface of said shoe central portion so that said second locking tab is spaced from said inner surface of said shoe central portion.

14. The chain tensioner as set forth in claim 13, wherein said second outer wall extends between and interconnects said second lower wall and said inner surface of said shoe central portion, said second outer wall comprising a pin-receiving opening defined therein.

15. The chain tensioner as set forth in claim 11, wherein said first and second locking tabs each comprise:
- an outer face including an inclined portion that extends toward the inner surface of the shoe central portion as it extends from the shoe rear face toward the shoe front face; and
- a lock face oriented transversely to the outer face;
- wherein said lock face of said first locking tab is oriented toward and is spaced from said first outer wall and said lock face of said second locking tab is oriented toward and is spaced from said second outer wall.

16. The chain tensioner as set forth in claim 15, wherein said outer face of each of the first and second locking tabs further includes a flat face that connects said inclined face to said lock face, wherein said flat face enables movement of said first and second spring ends into said first and second spring-receiving slots during assembly of said chain tensioner blade assembly.

17. The chain tensioner as set forth in claim 16, wherein:
- said first end of said spring is abutted with said first lower wall of said first slot; and,
- said second end of said spring is abutted with said second lower wall of said second slot.

18. The chain tensioner as set forth in claim 17, wherein said spring comprises a one-piece metal body,
- wherein said first and second end edges are defined continuously linearly or curved without interruption such that said first and second end edges extend continuously adjacent said first and second lower walls in said first and second spring-receiving slots over said full length of said first and second end edges.

* * * * *